United States Patent [19]

Graf Von Ingelheim

[11] Patent Number: 4,751,817
[45] Date of Patent: Jun. 21, 1988

[54] FLUID MACHINE AND A METHOD OF CONTROLLING THE SAME

[76] Inventor: Peter Graf Von Ingelheim, Sillertshausen 35, D-8309 Au i.d. Hallertau, Fed. Rep. of Germany

[21] Appl. No.: 712,199

[22] Filed: Mar. 15, 1985

[30] Foreign Application Priority Data

Mar. 17, 1984 [DE] Fed. Rep. of Germany ....... 3409934
Apr. 17, 1984 [DE] Fed. Rep. of Germany ....... 3414490

[51] Int. Cl.⁴ .............................................. F16D 33/02
[52] U.S. Cl. ......................................... 60/352; 60/357
[58] Field of Search ........................... 60/352, 357, 359

[56] References Cited

U.S. PATENT DOCUMENTS 2,683,350  7/1954  Ödman ................................. 60/352
3,220,187  11/1965  Perkins ................................ 60/352

FOREIGN PATENT DOCUMENTS 358335   9/1980  Austria .
2900289  7/1980  Fed. Rep. of Germany .
3012388  10/1981 Fed. Rep. of Germany .
3101131  8/1982  Fed. Rep. of Germany .
901125   7/1945  France .
935340   6/1948  France .
323700   8/1957  Switzerland .
2009854  6/1979  United Kingdom .
2059515  4/1981  United Kingdom .

*Primary Examiner*—Stephen F. Husar
*Attorney, Agent, or Firm*—Foley & Lardner, Schwartz, Jeffery, Schwaab, Mack, Blumenthal & Evans

[57] ABSTRACT

In a fluid machine, for instance a hydrodynamic transmission, an injector means (31) including an adjusting member (32) acting as a throttle is provided upstream of the inlet (28) to the turbine wheel (23). At the injector means (31), two fluid components having different flow velocities are combined, one of said fluid components being a part of the total fluid flow which flows into the working part (23) and which is returned through a bypass passage (30) from the outlet (27) of the working part (23) to the inlet (28) thereof.

21 Claims, 5 Drawing Sheets

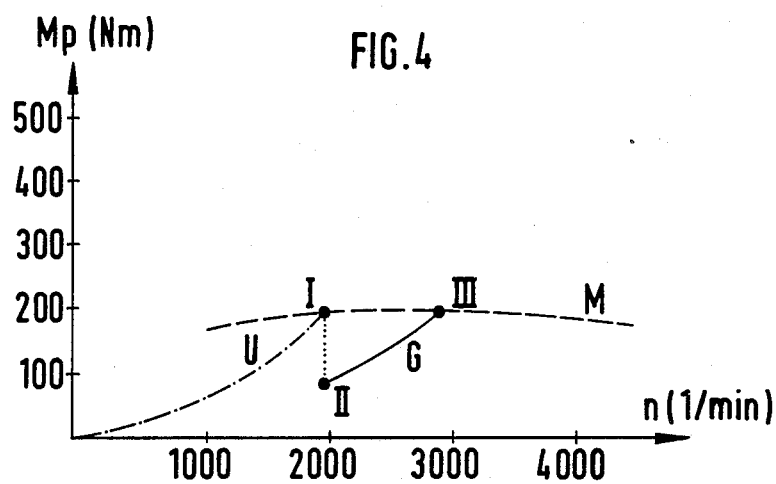
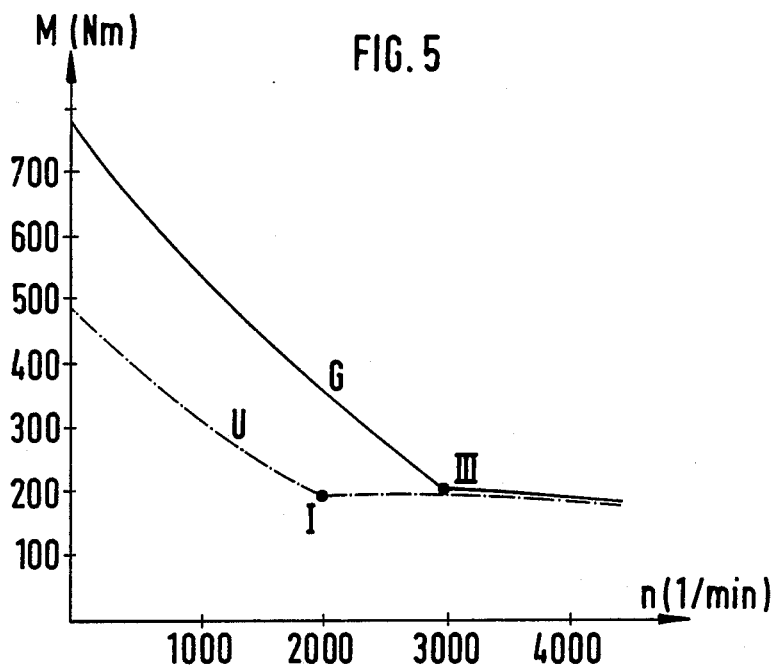

FLUID MACHINE AND A METHOD OF CONTROLLING THE SAME

The invention is directed to a fluid in particular to a pump, a turbine, or a hydrodynamic transmission, and to a method of controlling such a fluid machine.

From the Austrian Patent Specification No. 358,335 an opentype process gas turbine has been known, which comprises so-called ejector or injector means where two streams of fluid of different pressures or velocities, respectively, are combined. In said injector means the pressure medium, i.e. the higher-pressure fluid, flows through a nozzle and upon discharge therefrom draws the low-pressure fluid from a passage provided downstream of the nozzle outlet. The resulting total fluid flow has a reduced flow velocity relative to the flow of pressure medium, but comprises an increased fluid quantity so that the overall momentum will be retained. By varying the cross-sectional area of the nozzle, the flow parameters of the pressure medium and thus the intake operation are controlled such that the quantity and velocity of the total fluid flow may be properly controlled as desired. In the known gas turbine, the two flow components are supplied to the injector means via pressure lines from external reservoirs, i.e., there is no closed-loop fluid circuit.

A fundamental problem of fluid machines such as pumps, turbines and hydrodynamic transmissions resides in their unfavourable behaviour when there is a deviation from the design point, and in the resulting poor controllability of such machines. The design point, i.e., the optimum operating point, is fixed in the family of characteristics of fluid machines, the so-called throttling curves, by predetermined levels of pressure or delivery head, respectively, rate of flow and rotational speed. Any deviation of even one of these parameters from the design point may completely alter the operating characteristic of the machine.

To illustrate this by an example, the mode of operation of a centrifugal pump shall be explained which has the rotational speed $n_0$ with the output being $P_0$. At this speed $n_0$, which is assumed to be constant, the throttling curve of this pump exhibits a distinct maximum, which is fixed by the coordinates $H_{opt}$=optimum delivery pressure and $V_{opt}$=optimum delivery and indicates the optimum operating point. At this operating point the machine operates with maximum efficiency $\eta_{max}$, whereas a deviation from the operating point will result in a steep drop in efficiency. This makes it difficult to operate the pump with a high efficiency $\eta$ at varying conditions of operation.

A reduction of the pump flow rate by throttling of the pump basically results in an increase in delivery pressure while the torque decreases and the energy consumption is reduced, but in practical use this delivery pressure has an upper limit. With a conventional throttle at the pump outlet, the increased delivery pressure will be reduced due to the fact that the potential energy produced is converted to heat, so that it is lost without being utilized. In an ideal machine, on the other hand, with the output P being constant the delivery V is inversely proportional to the delivery pressure H, i.e., the delivery V will increase with decreasing delivery pressure H. In an actual pump, however, the flow velocity, and in quadratic dependency on the flow velocity in the rotor the flow losses, will be increased with an increase in delivery V. Therefore maximum efficiency is obtained only in one point of the throttling curve.

Similar relationships also hold for turbines and hydrodynamic transmissions or Föttinger speed converters, as they are called, which are composed substantially of a centrifugal pump in combination with a liquid jet turbine. Such fluid transmissions are widely used as hydrodynamic couplings and, when an additional reaction member is incorporated, as hydrodynamic converters in mechanical engineering, especially as automatic transmissions for automotive vehicles.

It is an object of the present invention to provide a fluid machine such as a pump, a turbine or a fluid transmission, which has a relatively simple and compact and therefore inexpensive structure and may be operated especially without the supply of fluid from external accumulators and at varying load conditions at the optimum operating point, i.e., with high efficiency, by control of the flow rate parameters of the fluid stream.

This object is solved with a fluid machine which comprises: a working part having a fluid inlet and a fluid outlet; injector means disposed upstream of the inlet of said working part to mix a first flow component of higher specific energy content with a second flow component of lower specific energy content, and including an adjusting member for controlling the cross-sectional area through which one of said flow components passes; and bypass means for returning part of the total flow, that is introduced into said working part, to said injector means as one of said two flow components.

Accordingly, injector means is provided upstream of the inlet to a working part such as a pump impeller or a turbine wheel, and a part of the fluid flow introduced into the working part is returned through bypass means to said injector means. It is thereby possible to control in a closed-loop fluid circuit the fluid flow rate and the fluid velocity in the working part. The flow portion returned through the bypass means and not required for the desired operation at the predetermined operating point recirculates through the working part, so that the latter operates with a fluid quantity that corresponds to a more favourable operating point. The returned fluid quantity is utilized at the injector means to improve the inlet flow conditions.

The term "specific energy content" as used in the application relates to the potential or kinetic energy of the fluid as normalized to the fluid quantity.

Preferred embodiments of the invention will be described in detail below with reference to the accompanying drawing, in which:

FIG. 4 is a graph showing the torque characteristic as a function of the rotational speed according to the primary curves of a hydrodynamic converter as shown in FIG. 3;

FIG. 5 is a graph showing the torque characteristic as a function of the rotational speed according to the secondary curves of a hydrodynamic converter as shown in FIG. 3;

Figure 1:
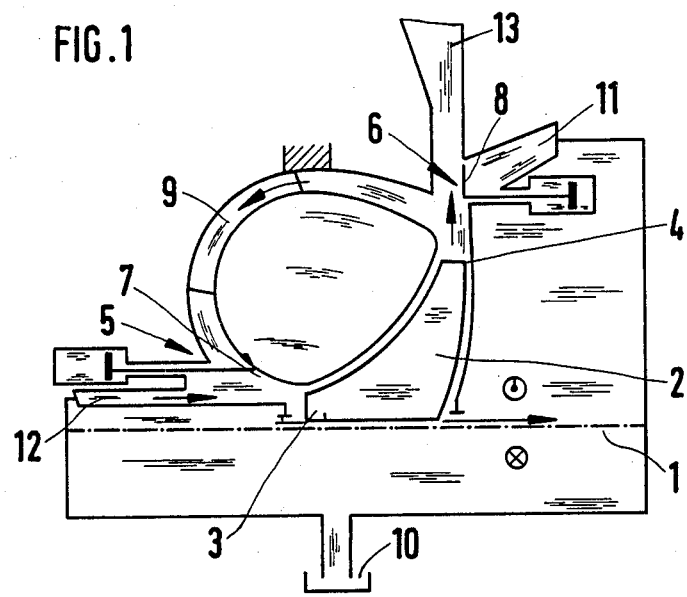
FIG. 1 is a schematic sectional view of a centrifugal pump designed in accordance with the invention.

FIG. 1 is a schematic sectional view of a centrifugal pump (or of a compressor—if the fluid is a gas) including an impeller 2 mounted on an input shaft 1. Injector means 5 and 6 are provided at the inlet 3 and the outlet 4 of the impeller 2, respectively, each injector including a driving nozzle whose cross-sectional area may be varied by means of an adjusting member 7 and 8, respectively which acts as a throttle. The impeller outlet 4 is communicated to the impeller inlet 3 via a bypass means 9, which serves as driving passage for the injector means 5 provided at the inlet 3. The adjusting member 7 of this injector means 5 permits simultaneous variation of the cross-section of the bypass 9 and the impeller inlet 3. At the injector 6 provided on the outlet side 4 of the impeller 2, the fluid flow discharged from the pump and a lower-pressure fluid flow are combined, the latter being drawn from a delivery passage 11 in communication with a low-pressure reservoir 10. When the adjusting member 8 of the injector means 6 is in its initial position, i.e., when the outlet conduit 13 of the impeller 2 is fully opened, and the bypass means 9 is fully closed by the adjusting member 7, the pump will supply a fluid quantity $V_0$ at the delivery pressure $H_0$. When only a delivery of $V_1 < V_0$ is required, the rate of flow through the pump is restricted accordingly. At a conventional throttle, the resulting increased delivery pressure $H_1$ would be decreased, and the potential energy would be converted into heat. In the illustrated pump, the cross-section of the outlet conduit 13 is reduced at the injector means 6 by the adjusting member 8, and at the same time the supply passage 11 is opened, so that the pump will have to deliver only a fluid quantity $V_2 < V_1$, thus requiring reduced pump output. The differential quantity $V_1 - V_2$ is drawn from the low-pressure supply passage 11 by the high-pressure fluid discharged from the pump.

When the adjusting member 7 of the injector means 5 at the pump inlet 3 is used to open the bypass passage 9, and when the cross-section of the outlet conduit 13 at the injector means 6 is reduced, a portion of the fluid stream discharged from the pump will return at high velocity to the pump inlet 3, i.e., the bypass passage 9 serves as driving passage of the injector means 5 disposed thereat.

The injector means 5 is designed in such a way that no impact losses in the inlet fluid result with the respective blading of the impeller 2 at the impeller inlet 3, and that cavitation phenomena are avoided. The velocity of the fluid discharged from the injector means 5 and flowing into the impeller 2 may be controlled by selection of the mixing ratio of the combined fluid streams, the spacing of the injector driving nozzle from the impeller inlet 3, and other parameters, such that a positive torque will be produced at the impeller 2.

It is therefore possible with the injector means 5 and 6 disposed at the inlet 3 and the outlet 4 of the pump, respectively, and with the return passage or bypass 9 provided between outlet 4 and inlet 3 to control the rate of flow through the pump, the flow velocity in the impeller, the delivery pressure, and the delivery at varying operating conditions in such a way that the pump operates with optimum efficiency.

Figure 2:
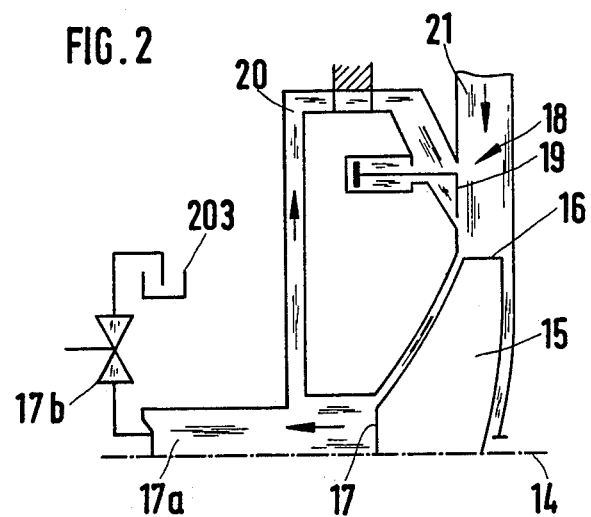
FIG. 2 is a schematic sectional view of a turbine designed in accordance with the invention.

FIG. 2 is a schematic sectional view of a turbine according to the invention. From the turbine wheel outlet 17, from which in this case a relatively low-velocity fluid is discharged, a return or bypass passage 20 extends via an injector means 18 back to the turbine wheel inlet 16. By means of the adjusting or throttling member 19 of the injector means 18 it is possible to vary the cross-section of the bypass passage 20, which is used as delivery passage, and simultaneously of the turbine wheel inlet conduit 21, which is used as working passage. Thus, the injector means 18 permits control of the velocity, the pressure and the quantity of fluid flowing into the turbine wheel 15. Similar to the above-described centrifugal pump, in this case also the injector driving nozzle is directed such that impact losses upon inflow of fluid into the turbine wheel blades are minimized in the throttle at the design speed of the turbine and the design velocity of the fluid. The quantity and velocity of fluid flowing out of the turbine can be controlled by means of an adjustable throttle 17b disposed in an outlet conduit which leads to a low-pressure reservoir.

Figure 3:
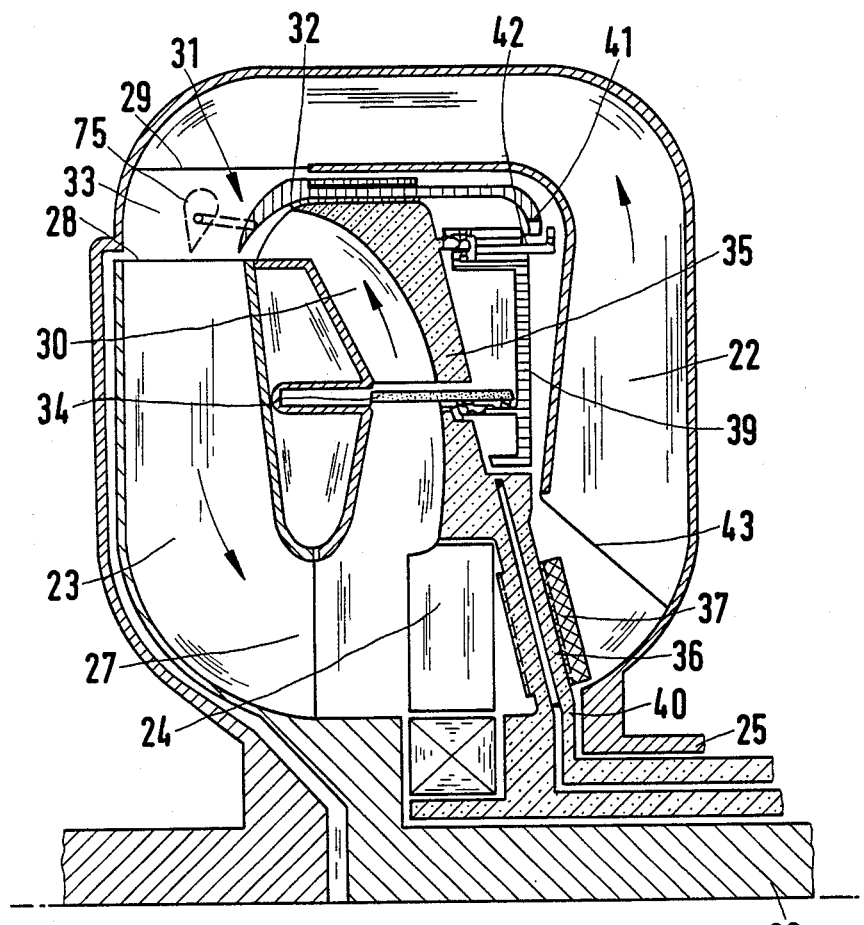
FIG. 3 is a sectional view of a Trilok-type hydrodynamic converter designed in accordance with the invention.

The essential advantages will result when the invention is used with a hydrodynamic transmission such as illustrated, for instance, in the sectional view of FIG. 3. A hydrodynamic transmission or Föttinger speed converter is substantially composed of a pump impeller 22 and a turbine wheel 23 and—provided converter operation is desired—a guide wheel 24. Therefore, the positive effects obtained in a centrifugal pump and in a turbine explained with reference to FIGS. 1 and 2 will overlap each other in such a fluid transmission.

The hydrodynamic converter illustrated in FIG. 3, which is designed as a two-phase Trilok converter, comprises an extended impeller 22 mounted on an input shaft 25, and a shortened turbine wheel 23 seated on an output shaft 26 as well as a guide wheel 24. A feedback passage 30 extends from the turbine wheel outlet 27 to the turbine wheel inlet 28 and the impeller outlet 29, respectively, i.e., a bypass means through which a portion of the fluid discharged from the turbine wheel 23 flows past the impeller 22 and back to the turbine wheel inlet 28. The two fluid streams discharged from the impeller 22 and the bypass passage 30 are combined at an injector means 31, and the adjusting member 32 thereof, which acts as throttle, simultaneously permits an increase in the cross-sectional area of the bypass passage 30 and a decrease of the cross-sectional area of the passage 33 provided between impeller outlet 29 and turbine wheel inlet 28. Furthermore, in the present embodiment an additional annular throttle 34 is provided upstream of blades 35 disposed in the bypass passage 30 for varying the opening of the bypass passage 30.

The bypass passage 30 is an annular radial passage comprising rigid blades 35 in supports 36 fixed to the housing, said supports terminating in the inner torus of the converter and being exposed to the fluid flow. Therefore they produce a flow resistance which results in power losses. In order to minimize such losses, the cylindrical supports 36 are surrounded by hydrodynamically favourable section members 37 which are preferably oriented by the fluid flow like weather-vanes in such a way as to offer only minimum flow resistance.

The adjusting member 32 of the injector means 31 as well as the throttle 34 in the bypass passage 30 are annular members concentric with the converter axis 26, so-called throttle rings. These throttle rings offer the advantage that only a single element has to be moved against a static pressure, which is low in fast-flowing fluids. The dynamic pressure acts radially on the ring circumference and is thus cancelled at the ring.

The ring throttles 32 and 34 are axially movable by means of an actuator wheel 39, which is concentric to the converter axis 26. In the present embodiment, the actuator wheel 39 may be rotated from outside of the converter housing through hydraulic means disposed in the inner torus of the converter. Said means is supplied with hydraulic fluid through ducts 40 formed in the supports 36. The annular adjusting member 32 is provided on its inner periphery with radially extending portions 41 which latchingly engage in helical grooves 42 formed on the outer periphery of the actuator wheel 39. Turning of the actuator wheel 39 will result in an axial displacement of the prolongations 41 and thus of the adjusting member 32. The throttle 34 is actuated through a similar mechanism.

The mode of operation of the hydrodynamic converter illustrated in FIG. 3 will be described with reference to FIGS. 4 and 5, which show portions of the primary curves and the secondary curves, respectively, i.e., portions of the torque curve M as a function of the rotational speed n.

When the adjusting member 32 of the injector means 31 in the hydrodynamic converter shown in FIG. 3 has the position indicated, the impeller outlet 29 is unthrottled and the bypass passage 30 is closed, so that the fluid circuit of the conventional Trilok converter is established. Due to the fluid flowing from the pump 22 into the turbine, the pump torque becomes effective at the turbine wheel 23. The fluid discharged from the turbine produces at the turbine wheel 23 an additional positive reaction moment in the direction of rotation turbine, said moment decreasing with increasing rotational speed of the turbine. The guide wheel 24, which is disposed downstream of the turbine wheel 23, serves to deflect the fluid discharged from the turbine, so that the fluid will flow back at low loss into the pump inlet 43. The pump torque $M_P$ acts on the impeller 22, and the turbine torque $M_T$ acts on the turbine wheel 23, said turbine torque resulting as the sum of the pump torque $M_P$ and the reaction moment $M_R$. This effect causes the "conversion", i.e., the torque-increasing effect at the turbine 23.

In conventional, non-adjustable Trilok converters whose pump is driven, for instance, by an internal combustion engine, the pump may rotate at the stall point, i.e., when the turbine is inoperative, only at a predetermined maximum rotational speed, the "stall speed" as it is called. This is due to the fact that the output required at the pump increases proportionally to the power of three of n, whereas the maximum possible output of the internal combustion engine increases only linearly with the speed n. The "stall speed" is apparent from the primary curves of the converter in FIG. 4; it is located at the intersection I of the curve of moments U of the unthrottled pump and the curve of moments M of the internal combustion engine.

The converter having the structure according to the invention is adapted to be controlled via the injector means 31 and the bypass passage 30, whereby the maximum torque of the turbine can be considerably increased, above all at low rotational speeds of the turbine. This increase in turbine torque is substantially due to two effects that will be described below:

(1) Increase in pump output

For starting the hydrodynamic transmission according to FIG. 3, the annular adjusting member 32 is moved in front of the pump outlet 29 to thereby throttle the pump and open the bypass passage 30. Thereby the pump flow rate $\dot{V}_P$ will drop from $\dot{V}_P(I)$ to $\dot{V}_P(II)$, and the required pump output drops from P (I) to P (II) and the pump torque drops from $M_P(I)$ to $M_P(II)$. In accordance with FIG. 4 it is thereby possible to increase the rotational speed n of the pump until in the characteristic point III the maximum engine torque M is again achieved. The fluid flowing from the pump into the turbine produces a jet pressure at the turbine wheel inlet 28 in dependency on the flow rate of the pump $\dot{V}_P$ and the discharge velocity. The reaction moment $M_R$ at the turbine is a function of the fluid quantity discharged from the turbine and of the discharge velocity.

The following relationship applies to fluid transmissions (E. Kickbusch, "Föttinger-Kupplungen und Föttinger-Getriebe", Springer-Verlag 1962):

$$\omega_P \cdot M_P = \rho \cdot \dot{V}_P H_P$$

wherein:
$M_P$ = torque of the pump
$\omega_P$ = angular speed of the pump
$P_\rho$ = specific weight of the fluid
$\dot{V}_P$ = pump flow rate per unit of time
$H_P$ = work of the pump per kg of pump fluid Since in accordance with FIG. 4 the speed of the pump is higher at the characteristic point III than at the point I, i.e., $\omega_P (III)/ \omega_P (I) > 1$, and since the pump torques are approximately equal, i.e., $M_P (I) \delta M_P (III)$, there results:

$$\dot{V}_P(III) \cdot H_P(III)/\dot{V}_P(I) \cdot H_P(I) = \omega_P(III)/\omega_P(I) > 1$$

Consequently, the jet pressure at the turbine wheel inlet 28 is increased at the characteristic point III relative to that at the characteristic point I.

In converters with conventional throttles, i.e., without injector means, a considerable portion of the energy of the pump stream is converted to thermal energy downstream of the throttle due to the Borda-Carnot effect and therefore it cannot be utilized. In the converter according to the invention, however, an exchange of momentum between the fluid discharged from the pump and the bypass fluid takes place in the passage 33 downstream of the injector means 31, so that quantity and velocity of the fluid discharged from the turbine and thus also the reaction moment at the turbine will be increased.

(2) Reduction of the flow losses

From the balance equation of a converter it is apparent that the sum of the delivery heads of pump and turbine as well as the equivalent delivery head of impact and friction losses must be zero. With the converter according to the invention, which has the injector means 31 provided at the impeller outlet 28, it is possible to reduce impact losses upon transfer of the fluid from the pump into the turbine, mainly at low rotational speeds of the turbine due to a variation of the discharge direction and velocity at the impeller outlet 29, to a fraction of the impact losses of conventionally throttled Trilok converters. Furthermore, due to a reduction of the pump flow rate by means of the bypass passage 30, the friction losses in the pump and the guide wheel as well as impact losses at the guide wheel 24 will be reduced.

From the secondary curves shown in FIG. 5, the effect of throttling and subsequently increasing the rotational speed of the pump will be apparent. For the unthrottled converter (curve U) the conversion range will pass into the coupling range at 2000 r.p.m., and for the throttled converter (curve G) this point occurs at 3000 r.p.m., so that the conversion range is consequently extended. The converter according to the invention as illustrated in FIG. 3 may be controlled via the injector means 31 and the bypass passage 30 in such a way that all operating points below the curve G may be realized, whereas in conventional Trilok converters the operating points are located along a curve, i.e., the conventional converter characteristic passes into a conversion range.

The hydrodynamic converter shown in FIG. 3 including a radially designed centripetal turbine may also be used as hydrodynamic brake. When the turbine wheel 23 rotates at high speed and the pump outlet 29 is throttled by means of the annular adjusting member 32 and the bypass passage 30 is opened, the radial-type turbine operates in the pump mode. It will then deliver the fluid in reverse direction of flow through the bypass passage 30, whose rigid blading applies a braking moment on the turbine wheel 23. This braking moment may be controlled by the position of the annular throttle 32.

As pump drive unit for a hydrodynamic transmission an internal combustion engine is frequently used, said engine having a certain idle speed. Because of the continuously rotating pump, a turbine torque will also be produced when it is not desired, so that unnecessary consumption of energy and the "creeping tendency" of automotive vehicles with automatic transmission will result. In the hydrodynamic transmission according to the invention and illustrated in FIG. 3, the pump may be throttled when the turbine is either at a standstill or rotating slowly, whereby the pump torque and the energy consumption will be reduced and the "creeping tendency" will disappear.

Figure 6:
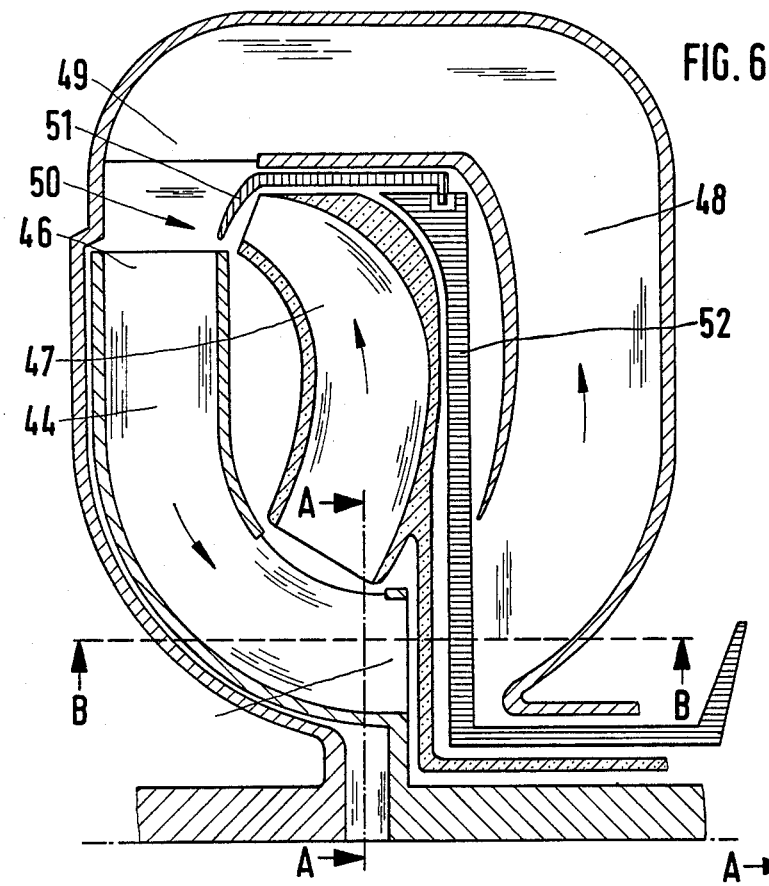
FIG. 6 is a sectional view of a hydronamic transmission designed in accordance with the invention.

FIG. 6 illustrates a further embodiment of a hydrodynamic transmission according to the invention, which may be used as both hydrodynamic coupling and hydrodynamic converter. In accordance with this embodiment, a bypass passage 47 branches off upstream of the outlet 45 of the turbine wheel 44, through which bypass passage a portion of the fluid introduced into the turbine wheel 44 flows past the impeller 48 of the pump and back to the turbine wheel inlet 46. Between the impeller outlet 49 and the turbine wheel inlet 46 there is provided an injector means 50 including a adjusting member 51 in the form of a ring throttle by means of which the passage cross-section between impeller outlet 49 and turbine wheel inlet 46 and at the same time the free cross-section of the bypass passage 47 may be adjusted. The ring throttle 51 is axially moved by means of an externally rotatable setting wheel in a manner similar to that described in conjunction with the embodiment shown in FIG. 3.

Figure 7:
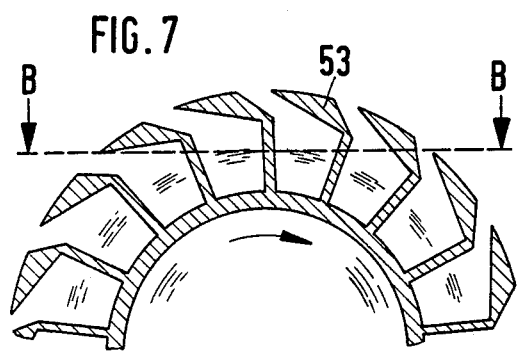
FIG. 7 is a sectional view along the line A—A of FIG. 6.
Figure 8:
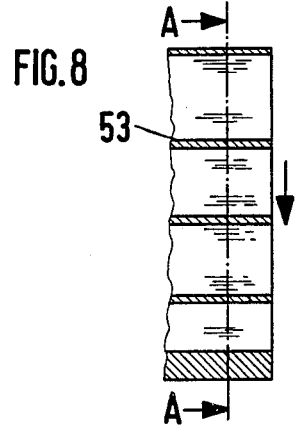
FIG. 8 is a sectional view along the line B—B of FIG. 6.

The mode of operation of the transmission shown in FIG. 6 substantially corresponds to that of the embodiment of FIG. 3, but the structure has been simplified such that converter operation without guide wheel is also possible. To this end the turbine wheel blades 53 according to FIG. 7 (sectional view along the line A—A of FIG. 6) and FIG. 8 (sectional view along the line B—B of FIG. 6) are designed in such a way and the bypass passage 47 is arranged such that the fluid flow which flows from the turbine into the bypass passage 47 when the pump is throttled, and the fluid flow exiting from the bypass passage, respectively apply a reaction moment on the turbine wheel 44. The turbine wheel blades 53 and the bypass passage 47 thus act as torque support and permit converter operation.

Figure 9:
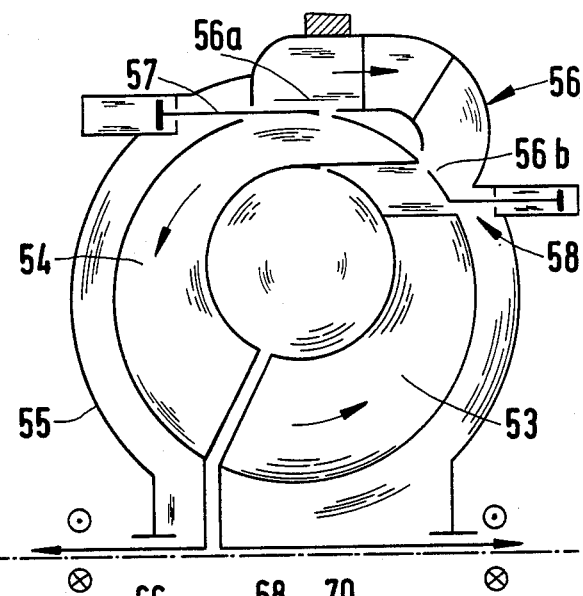
FIG. 9 is a schematic sectional view of a hydrodynamic coupling designed in accordance with the invention.

FIG. 9 is a schematic sectional view of a further embodiment of a hydrodynamic coupling according to the invention. An impeller 53 and a turbine wheel 54 are disposed in a housing 55. A bypass passage 56 branches off from the turbine wheel 54 and carries a portion of the fluid that flows through the turbine wheel 54 back to the outlet of the impeller 53. In this case the bypass passage 56 does not extend in the inner torus of the converter but on the outside of the housing 55, whereby the structure is simplified. At the inlet 56a a throttle 57 is provided, and at the outlet 56b from the bypass passage 56 an injector means 58 is provided. The mode of operation and control of this hydrodynamic transmission correspond to the embodiment described with reference to the FIGS. 3 to 5.

Figure 10:
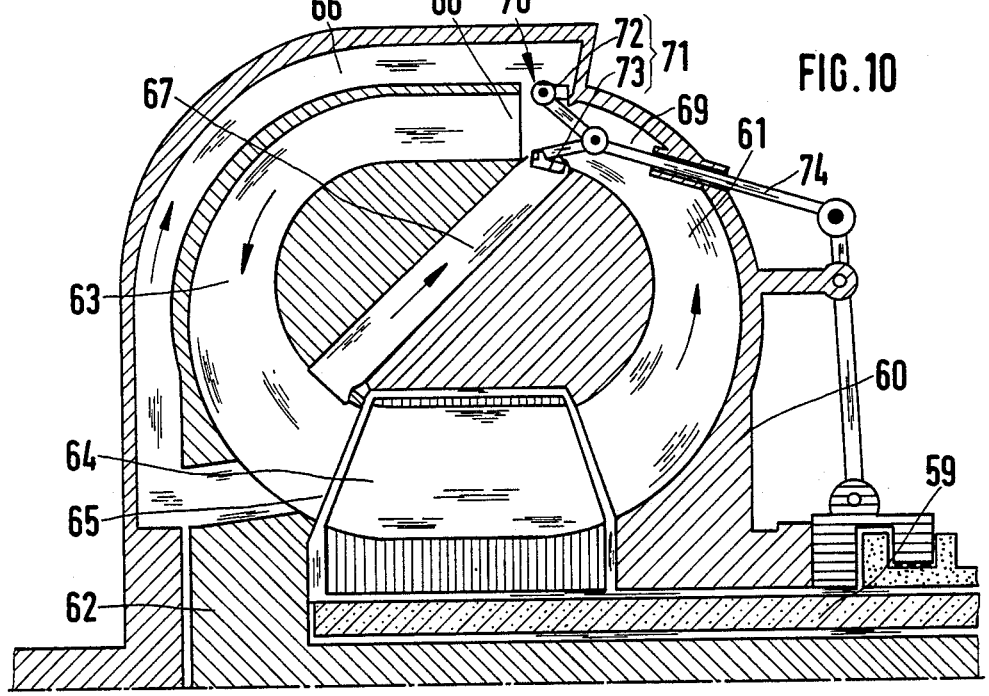
FIG. 10 is a sectional view of a hydrodynamic converter in accordance with a further embodiment of the invention.

FIG. 10 shows a further embodiment of a fluid transmission designed in accordance with the invention. Here, a housing 59 contains an impeller 61 mounted on an input shaft 60 and a turbine wheel 63 mounted on an output shaft 62. The guide-wheel 64 of the transmission, which is a Trilok converter, is mounted for free-running motion in the housing 59. From the turbine wheel outlet 65, a bypass passage 66 on the outside of the turbine wheel 63 and a bypass passage 67 in the inner torus of the converter lead back to the turbine wheel inlet 68. Between the impeller outlet 69 and the turbine wheel inlet 68 there is provided an injector means 70, in which the fluid flow exiting from the pump impeller 61 and the flow components from the bypass means 66 and 67 are combined. In this case, the adjusting member 71 of the injector means 70 is formed by valve flaps 72, 73 mounted in two rings, said valve flaps defining the cross-sectional area of the outlet opening of the impeller 61. By means of a linkage 74, which is actuated from outside of the converter, the outer valve flaps 72 may be moved inwardly and the inner valve flaps 73 may be moved outwardly. By means of such a valve movement the bypass means 66 and 67 are opened, while the cross-sectional area of the impeller outlet is reduced. The mode of operation of this embodiment again corresponds to that of the embodiment according to FIG. 3.

In the embodiments according to FIG. 3 and FIG. 6, the adjusting members of the injector means are actuated by means of an annular setting wheel disposed concentrically to the converter axis; in the embodiment shown in FIG. 10, a linkage is used to actuate the throttle valves of the injector means. Furthermore, it is also possible to provide in the fluid flow an actuating element as indicated, for instance, at 75 in FIG. 3, which is adjustable by said fluid flow and moves the adjusting member of the injector means, e.g. the annular throttle or the throttle valves.

Another advantageous application of the invention resides in a turbo-supercharger for combustion engines, which are known to generate no power in their lower speed ranges. Designing the turbine of such a turbo-supercharger in accordance with FIG. 2 enables a favorable control of the supercharger in all speed ranges by adjusting the throttle 19 in response to the operating point of the engine.

I claim:

1. A fluid machine comprising:
   a working part having a fluid inlet and a fluid outlet;
   injector means disposed upstream of the inlet of said working part to mix a first flow component of higher specific energy content with a second flow component of lower specific energy content, and including an adjusting member for controlling the cross-sectional area through which one of said flow components passes; and
   bypass means for returning part of the total flow, that is introduced into said working part, to said injector means as one of said two flow components;
   said working part including a turbine, the returned part of the total flow constituting said second flow component of said injector means;
   said turbine being connected with a pump to form a fluid transmission, said injector means being provided intermediate the pump outlet and the turbine inlet.

2. A fluid machine as claimed in claim 1, including blades provided in said bypass means.

3. A fluid machine as claimed in claim 2, including a throttle member provided upstream of the blades of said bypass means.

4. A fluid machine as claimed in claim 3, wherein said throttle member comprises an annular member concentric to the axis of rotation of said working part.

5. A fluid machine as claimed in claim 1, wherein said bypass means is formed by a member fixed to the housing in the inner torus of the machine, supports of said member, extending through the flow passage and being provided with section elements for reducing the resistance to flow.

6. A fluid machine as claimed in claim 5, wherein said section elements are adapted to be rotated about said supports and to be adjusted by the flow to their minimum flow resistance.

7. A fluid machine as claimed in claim 1, wherein the blades of said turbine wheel are configured such that the fluid guided into said bypass means applies a reaction moment to said turbine wheel acting in the direction of rotation thereof.

8. A fluid machine as claimed in claim 4, including an actuating element provided in the flow, said actuating element being adjustable by the flow to move an adjusting member of said adjusting means.

9. A method of controlling a fluid transmission machine comprising a turbine and a pump so as to increase torque obtainable at the turbine, said method comprising the steps of:
   reducing pump torque by throttling the pump with an adjusting member of an injector means operatively located intermediate an outlet of the pump and an inlet of the turbine; and
   increasing pump speed by opening a bypass to return a portion of a total turbine flow to said injector means and by operating said injector means to mix a first flow component from said pump with said returned portion of said total turbine flow.

10. A method as claimed in claim 9, wherein said pump in an unthrottled condition has a stall speed below a maximum rotational speed of the pump drive mechanism.

11. A method as claimed in claim 9, further comprising the steps of:
    braking at high turbine speeds by throttling the pump outlet with said adjusting member so that the turbine will operate in a pump mode to reverse the direction flow and urge the fluid through blades provided in said bypass; and
    controlling the braking moment produced at the turbine by controlling the position of a throttle member provided upstream of the blades of said bypass.

12. A method as claimed in claim 9, further comprising the step of:
    reducing torque of both said pump and said turbine as the pump drive mechanism rotates at a minimum speed and the turbine is either at a standstill or rotates slowly by at least partially closing said pump outlet with said adjusting member.

13. A fluid machine comprising:
    a working part having a fluid inlet for admitting a primary fluid, and a fluid outlet,
    bypass means for returning part of the total fluid flow from said fluid outlet to said fluid inlet as a secondary fluid,
    one of said primary and secondary fluids having a higher specific energy content and the other of said fluids having a lower specific energy content,
    injector means disposed at said fluid inlet for variably mixing said primary and secondary fluids, and
    means for adjusting the cross-sectional area through which passes said one of said primary and secondary fluids having the higher specific energy content,
    whereby part of the potential energy of said higher specific energy content fluid is converted into kinetic energy thereby impelling and producing a jet effect on the fluid having the lower specific energy content.

14. A fluid machine as claimed in claim 13, wherein said working part is a pump.

15. A fluid machine as claimed in claim 14, further including a variably controllable injector means provided at the outlet from the pump.

16. A fluid machine as claimed in claim 15, wherein said two recited injector means are controlled in such a way that, upon reduction of the cross-section of the outlet conduit through said further injector means, the cross-section of said bypass means is increased through said first injector means.

17. A fluid machine as claimed in claim 13, wherein said working part is a turbine, the bypassed and returned part of the total flow constituting said lower specific energy content fluid.

18. A fluid machine as claimed in claim 13, wherein said adjusting means comprises an annular member concentric to the axis of rotation of said working part.

19. A fluid machine as claimed in claim 18, wherein said annular member is axially movable via helical guide means.

20. A fluid machine as claimed in claim 19, wherein said helical guide means is mounted on a setting wheel which is concentric to the axis of rotation of said working part.

21. A fluid machine as claimed in claim 13, wherein said adjusting means in its one end position blocks said bypass means and upon movement away from said end position restricts the cross-section through which said bypassed fluid component passes.

* * * * *